US012408667B2

(12) United States Patent
Zagar et al.

(10) Patent No.: US 12,408,667 B2
(45) Date of Patent: Sep. 9, 2025

(54) HERBICIDAL MIXTURES COMPRISING ISOXAFLUTOLE, PYROXASULFONE AND AN IMIDAZOLINONE HERBICIDE; AND THEIR USE IN SOYBEAN AND COTTON CULTURES

(71) Applicant: BASF SE, Ludwigshafen (DE)

(72) Inventors: Cyrill Zagar, Research Triangle Park, NC (US); Steven Joseph Bowe, Research Triangle Park, NC (US); Nicholas T. Fassler, Research Triangle Park, NC (US); Kyle Edward Keller, Research Triangle Park, NC (US)

(73) Assignee: BASF SE, Ludwigshafen (DE)

( * ) Notice: Subject to any disclaimer, the term of this patent is extended or adjusted under 35 U.S.C. 154(b) by 1161 days.

(21) Appl. No.: 17/260,691

(22) PCT Filed: Jul. 22, 2019

(86) PCT No.: PCT/EP2019/069624
§ 371 (c)(1),
(2) Date: Jan. 15, 2021

(87) PCT Pub. No.: WO2020/025367
PCT Pub. Date: Feb. 6, 2020

(65) Prior Publication Data
US 2021/0289786 A1  Sep. 23, 2021

(30) Foreign Application Priority Data

Aug. 2, 2018  (EP) .................................... 18186930

(51) Int. Cl.
*A01N 43/80* (2006.01)
*A01N 43/50* (2006.01)
(52) U.S. Cl.
CPC .............. *A01N 43/80* (2013.01); *A01N 43/50* (2013.01)
(58) Field of Classification Search
CPC ......... A01N 43/80; A01N 43/50; A01P 13/00; A01P 21/00
See application file for complete search history.

(56) References Cited

U.S. PATENT DOCUMENTS

2008/0153704 A1\* 6/2008 Yamaji ................... A01N 43/80
504/136

FOREIGN PATENT DOCUMENTS

| CN | 105875628 A | 8/2016 |
| CN | 106818786 A | 6/2017 |
| CN | 108124877 A | 6/2018 |
| CO | 2021001136 A2 | 2/2021 |
| CO | 2021001137 A2 | 2/2021 |
| WO | WO-2009/112454 A2 | 9/2009 |
| WO | WO-2009115603 A2 \* | 9/2009 ............ A01N 41/10 |
| WO | WO-2009/141367 A2 | 11/2009 |
| WO | WO-2020025369 A1 | 2/2020 |
| WO | WO-2020025371 A1 | 2/2020 |

OTHER PUBLICATIONS

Arias, et al., "Molecular evolution of herbicide resistance to phytoene desaturase inhibitors in Hydrilla verticillata and its potential use to generate herbicide-resistant crops", Pest Management Science, vol. 61, Issue 3, Jan. 25, 2005, pp. 258-268.
Behrens, et al., "Dicamba Resistance: Enlarging and Preserving Biotechnology-Based Weed Management Strategies", Science, vol. 316, Issue 5828, May 25, 2007, pp. 1185-1188.
Catalogue of pesticide formulation types and international coding system, CropLife International, Technical Monograph No. 2, 6th Edition, May 2008, 7 pages.
Colby, "Calculating Synergistic and Antagonistic Responses of Herbicide Combinations", Weeds, vol. 15, Issue 1, Jan. 1967, pp. 20-22.
Dill, et al., "Glyphosate-resistant crops: adoption, use and future considerations", Pest Management Science, vol. 64, Issue 4, Dec. 14, 2007, pp. 326-331.
European Search Report for EP Patent Application No. 18186930.6, Issued on Nov. 6, 2018, 5 pages.
Green, "Evolution of Glyphosate-Resistant Crop Technology", Weed Science, vol. 57, Issue 1, Jan. 1, 2009, pp. 108-117.
Green, et al., "New multiple-herbicide crop resistance and formulation technology to augment the utility of glyphosate", Pest Management Science, vol. 64, Issue 4, Dec. 10, 2007, pp. 332-339.
Inui, et al., "Herbicide resistance in transgenic plants with mammalian P450 monooxygenase genes", Pest Management Science, vol. 61, Issue 3, Jan. 20, 2005, pp. 286-291.
Li, et al., "Development of PPO inhibitor-resistant cultures and crops", Pest Management Science, vol. 61, Issue 3, Jan. 20, 2005, pp. 277-285.
Matringe, et al., "p-Hydroxyphenylpyruvate dioxygenase inhibitor-resistant plants", Pest Management Science, vol. 61, Issue 3, Jan. 4, 2005, pp. 269-276.

(Continued)

*Primary Examiner* — Jeffrey H Murray
*Assistant Examiner* — Luisalberto Gonzalez
(74) *Attorney, Agent, or Firm* — MARSHALL, GERSTEIN & BORUN LLP

(57) ABSTRACT

The present invention relates to herbicidal mixtures comprising isoxaflutole, pyroxasulfone and an imidazolinone herbicide. The herbicidal mixtures may comprise at least one further herbicide selected from the group consisting of glyphosate and its salts, glufosinate and its salts, L-glufosinate (glufosinate-P) and its salts, dicamba and its salts and esters, 2,4-D and its salts and esters, bicyclopyrone, fenquinotrione, mesotrione, tembotrione, tolpyralate and topramezone. Furthermore, the invention relates to methods and uses applying the herbicidal mixtures, especially for controlling undesirable vegetation in soybean and cotton cultures.

13 Claims, No Drawings

(56) References Cited

OTHER PUBLICATIONS

Tan et al., "Imidazolinone-tolerant crops: history, current status and future", Pest Management Science, vol. 61, Issue 3, Dec. 31, 2004, pp. 246-257.

Williams et al., "Differences in zoospore germination and host penetration in response to temperature among Western Australian isolates of Plasmopara viticola", Australian Journal of Agricultural Research, vol. 58, Issue 7, Jul. 26, 2007, pp. 702-710.

International Application No. PCT/EP2019/069624, International Search Report and Written Opinion, mailed Oct. 4, 2019.

* cited by examiner

HERBICIDAL MIXTURES COMPRISING ISOXAFLUTOLE, PYROXASULFONE AND AN IMIDAZOLINONE HERBICIDE; AND THEIR USE IN SOYBEAN AND COTTON CULTURES

CROSS-REFERENCE TO RELATED APPLICATIONS

This is the U.S. national phase of International Application No. PCT/EP2019/069624, filed Jul. 22, 2019, which claims the benefit of European Patent Application No. 18186930.6, filed on Aug. 2, 2018.

The present invention relates to a herbicidal mixture comprising isoxaflutole (compound I), pyroxasulfone (compound II), at least one imidazolinone herbicide selected from the group consisting of imazamox, imazapyr, imazapic, imazaquin and imazethapyr and their salts (compound III) and optionally at least one further herbicide selected from the group consisting of glyphosate and its salts, glufosinate and its salts, L-glufosinate (glufosinate-P) and its salts, dicamba and its salts and esters, 2,4-D and its salts and esters, bicyclopyrone, fenquinotrione, mesotrione, tembotrione, tolpyralate and topramezone (compound IV).

The invention also relates to methods and uses for controlling undesirable vegetation in HPPD-tolerant soybeans and HPPD-tolerant cotton.

Isoxaflutole is a herbicide that acts through inhibition of the plant enzyme hydroxyphenylpyruvate dioxygenase (HPPD).

Tolerant or resistant soybean or cotton varieties (e.g. transgenic soybean or cotton varieties) provide the option to use herbicides, which are originally not selective, in respective tolerant or resistant soybeans or cotton in addition to conventional weed control system. One example is isoxaflutole which cannot be used in conventional soybeans or cotton because the crops are not sufficiently tolerant against its herbicidal action; but which can achieve effective weed control by post- and particularly by pre-emergence application in HPPD tolerant soybeans or cotton. Isoxaflutole is a broad-spectrum herbicide that controls many grass and broadleaf herbicide species; however, there are a few tough to control species or resistant biotypes that it does not fully control. Another challenge is the duration of action, or the degradation rate of the herbicide. Furthermore, changes in the sensitivity of harmful plants, which may occur upon prolonged use of the herbicides or within a geographical limited area, must also be taken into consideration. The resulting loss of action against individual plants can sometimes compensated for to a certain extent by higher application rates of the herbicides. However, there is always a demand for methods to achieve the herbicidal effect with lower application rates of active compounds to reduce not only the amount of an active compound required for application, but also the amount of formulation auxiliaries. Thus, low application rates are for economic and environmental reasons an objective to enhance the eco-friendliness of the herbicide treatment.

One possibility for improving the use profile of a herbicide is the combination of the herbicide in question with one or more other active compounds which have the desired additional properties. However, the combined use of a plurality of active compounds may lead to phenomena of a chemical, physical and biological incompatibility (e.g. instability of a coformulation, decomposition of an active compound or antagonism in the biological action of the active compounds). Thus, finding effective isoxaflutole combinations with an additional herbicide faces the challenge that in many instances the effectiveness of such combinations is not satisfactory and high application rates are still required to achieve an acceptable weed control.

Thus, it is an object of the present invention to find combinations of active compounds with a favorable profile of action, high stability and, ideally, synergistically enhanced activity for application in HPPD tolerant soybean or cotton, which allows the application rate to be reduced in comparison with solutions provided by prior art mixtures. Moreover, the persistence of the herbicidal activity of the mixture should be sufficiently long in order to achieve control of the weeds over a sufficient long time period thus allowing a more flexible application. The mixtures should also show an accelerated action on harmful plants and not affect the growth of the soybean or cotton plant.

Surprisingly, it has been found that mixtures of isoxaflutole and the herbicidal compounds II, III and optionally IV show enhanced herbicide action against undesirable vegetation in pre-emergence or post-emergence use in HPPD tolerant soybeans or cotton and/or show superior compatibility with the crop plant, i.e. their use leads to a reduced damage of the soybean or cotton plants and/or does not result in increased damage of the soybean or cotton plants, if compared to isoxaflutole alone.

Thus, the present invention relates to herbicidal mixtures of 1) isoxaflutole as compound I; and
2) pyroxasulfone as compound II; and
3) an imidazolinone herbicide selected from the group consisting of imazamox, imazapyr, imazapic, imazaquin and imazethapyr and their salts (compound III); and
4) optionally at least one further herbicide selected from the group consisting of glyphosate and its salts, glufosinate and its salts, L-glufosinate (glufosinate-P) and its salts, dicamba and its salts and esters, 2,4-D and its salts and esters, bicyclopyrone, fenquinotrione, mesotrione, tembotrione, tolpyralate and topramezone (compound IV).

Compounds I, II, III and IV as well as their pesticidal action and methods for producing them are generally known, for example in the Pesticide Manual V5.2 (ISBN 978 1 901396 85 0) (2008-2011) and the Compendium of Pesticide Common Names website (http://www.alanwood.net/pesticides/), amongst other sources.

In the inventive mixtures the weight ratio of compound I to compound II is preferably from 15:1 to 1:15, more preferably 10:1 to 1:10, in particular from 5:1 to 1:5.

In the inventive mixtures the weight ratio of compound I to compound III is preferably from 15:1 to 1:15, more preferably 10:1 to 1:10, in particular from 5:1 to 1:5.

In the inventive mixtures the weight ratio of compound I to compound IV is preferably from 100:1 to 1:1000, more preferably 10:1 to 1:100.

Preferred compounds Ill are imazamox, imazamox ammonium, imazapyr, imazapyr isopropylammonium, imazapyr ammonium, imazapic, imazapic ammonium, imazaquin, imazaquin ammonium, imazethapyr and imazethapyr ammonium. Particularly preferred are imazamox, imazamox ammonium, imazethapyr and imazethapyr ammonium, in particular imazethapyr and imazethapyr ammonium.

Preferred compounds IV are glyphosate, glyphosate dimethylammmonium, glyphosate isopropylammonium, glyphosate potassium, glyphosate trimesium (sulfosate), glufosinate, glufosinate ammonium, glufosinate sodium, L-glufosinate, L-glufosinate ammonium, L-glufosinate sodium, dicamba, dicamba ethanolamine salt, dicamba diglycolamine salt, dicamba potassium and dicamba BAPMA salt (i. e. dicamba N,N-bis(3-aminopropyl)methylamine salt), 2,4-D, 2,4-D choline salt, bicyclopyrone, fenquinotrione, mesotrione, tembotrione, tolpyralate and topramezone. Particularly preferred are glyphosate, glyphosate dimethylammmonium, glyphosate isopropylammonium, glyphosate potassium, glufosinate, glufosinate ammonium, L-glufosinate, L-glufosinate ammonium, L-glufosinate sodium, dicamba, dicamba ethanolamine salt, dicamba diglycolamine salt, dicamba potassium and dicamba BAPMA salt (i. e. dicamba N,N-bis(3-aminopropyl)methylamine salt), 2,4-D, 2,4-D choline salt, bicyclopyrone, fenquinotrione, mesotrione, tembotrione, tolpyralate and topramezone, in particular glyphosate, glyphosate dimethylammmonium, glyphosate isopropylammonium, glyphosate potassium, glufosinate, glufosinate ammonium, dicamba, dicamba ethanolamine salt, dicamba diglycolamine salt, dicamba potassium and dicamba BAPMA salt (i. e. dicamba N,N-bis(3-aminopropyl)methylamine salt), 2,4-D, 2,4-D choline salt, mesotrione, tolpyralate and topramezone.

In a particularly preferred embodiment of the invention, compound III is imazethapyr or imazethapyr ammonium and there is no compound IV present.

In another particularly preferred embodiment of the invention, compound III is imazethapyr or imazethapyr ammonium and compound IV is selected from the group comprising glyphosate, glyphosate dimethylammmonium, glyphosate isopropylammonium and glyphosate potassium.

In another particularly preferred embodiment of the invention, compound III is imazethapyr or imazethapyr ammonium and compound IV is selected from the group comprising glufosinate and glufosinate ammonium.

In another particularly preferred embodiment of the invention, compound III is imazethapyr or imazethapyr ammonium and compound IV is selected from the group comprising L-glufosinate, L-glufosinate ammonium and L-glufosinate sodium.

In another particularly preferred embodiment of the invention, compound III is imazethapyr or imazethapyr ammonium and compound IV is selected from the group comprising dicamba, dicamba ethanolamine salt, dicamba diglycolamine salt, dicamba potassium and dicamba BAPMA salt.

In another particularly preferred embodiment of the invention, compound III is imazethapyr or imazethapyr ammonium and a first compound IV is selected from the group comprising glyphosate, glyphosate dimethylammmonium, glyphosate isopropylammonium and glyphosate potassium and a second compound IV is selected from the group comprising dicamba, dicamba ethanolamine salt, dicamba diglycolamine salt, dicamba potassium and dicamba BAPMA salt.

In another particularly preferred embodiment of the invention, compound III is imazethapyr or imazethapyr ammonium and compound IV is selected from the group comprising 2,4-D and 2,4-D choline salt.

In another particularly preferred embodiment of the invention, compound III is imazethapyr or imazethapyr ammonium and a first compound IV is selected from the group comprising glyphosate, glyphosate dimethylammmonium, glyphosate isopropylammonium and glyphosate potassium and a second compound IV is selected from the group comprising 2,4-D and 2,4-D choline salt.

In another particularly preferred embodiment of the invention, compound III is imazethapyr or imazethapyr ammonium and compound IV is mesotrione.

In another particularly preferred embodiment of the invention, compound III is imazethapyr or imazethapyr ammonium and compound IV is topramezone.

In another particularly preferred embodiment of the invention, compound III is imazethapyr or imazethapyr ammonium and compound IV is tolpyralate.

Preferred mixtures of the present invention are listed in table 2, whereby the abbreviations are shown in table 1:

TABLE 1

| Compound | Abbreviation |
|---|---|
| imazamox | III-1 |
| imazamox ammonium | III-2 |
| imazapyr | III-3 |
| imazapyr isopropylammonium | III-4 |
| imazapyr ammonium | III-5 |
| imazapic | III-6 |
| imazapic ammonium | III-7 |
| imazaquin | III-8 |
| imazaquin ammonium | III-9 |
| imazethapyr | III-10 |
| imazethapyr ammonium | III-11 |
| glyphosate | IV-1 |
| glyphosate dimethylammonium | IV-2 |
| glyphosate isopropylammonium | IV-3 |
| glyphosate potassium | IV-4 |
| glyphosate trimesium (sulfosate) | IV-5 |
| glufosinate | IV-6 |
| glufosinate ammonium | IV-7 |
| glufosinate sodium | IV-8 |
| L-glufosinate | IV-9 |
| L-glufosinate ammonium | IV-10 |
| L-glufosinate sodium | IV-11 |
| dicamba | IV-12 |
| dicamba ethanolamine salt | IV-13 |
| dicamba diglycolamine salt | IV-14 |
| dicamba potassium | IV-15 |
| dicamba BAPMA salt | IV-16 |
| 2,4-D | IV-17 |
| 2,4-D choline salt | IV-18 |
| bicyclopyrone | IV-19 |
| fenquinotrione | IV-20 |
| mesotrione | IV-21 |
| tembotrione | IV-22 |
| tolpyralate | IV-23 |
| topramezone | IV-24 |

TABLE 2

| No | I | II | III | IV |
|---|---|---|---|---|
| M-1 | I | II | III-1 | — |
| M-2 | I | II | III-2 | — |
| M-3 | I | II | III-3 | — |
| M-4 | I | II | III-4 | — |
| M-5 | I | II | III-5 | — |
| M-6 | I | II | III-6 | — |
| M-7 | I | II | III-7 | — |
| M-8 | I | II | III-8 | — |
| M-9 | I | II | III-9 | — |
| M-10 | I | II | III-10 | — |
| M-11 | I | II | III-11 | — |
| M-12 | I | II | III-1 | IV-1 |
| M-13 | I | II | III-1 | IV-2 |
| M-14 | I | II | III-1 | IV-3 |
| M-15 | I | II | III-1 | IV-4 |
| M-16 | I | II | III-1 | IV-5 |
| M-17 | I | II | III-1 | IV-6 |
| M-18 | I | II | III-1 | IV-7 |
| M-19 | I | II | III-1 | IV-8 |
| M-20 | I | II | III-1 | IV-9 |
| M-21 | I | II | III-1 | IV-10 |

TABLE 2-continued

| No | I | II | III | IV |
|---|---|---|---|---|
| M-22 | I | II | III-1 | IV-11 |
| M-23 | I | II | III-1 | IV-12 |
| M-24 | I | II | III-1 | IV-13 |
| M-25 | I | II | III-1 | IV-14 |
| M-26 | I | II | III-1 | IV-15 |
| M-27 | I | II | III-1 | IV-16 |
| M-28 | I | II | III-1 | IV-17 |
| M-29 | I | II | III-1 | IV-18 |
| M-30 | I | II | III-1 | IV-19 |
| M-31 | I | II | III-1 | IV-20 |
| M-32 | I | II | III-1 | IV-21 |
| M-33 | I | II | III-1 | IV-22 |
| M-34 | I | II | III-1 | IV-23 |
| M-35 | I | II | III-1 | IV-24 |
| M-36 | I | II | III-2 | IV-1 |
| M-37 | I | II | III-2 | IV-2 |
| M-38 | I | II | III-2 | IV-3 |
| M-39 | I | II | III-2 | IV-4 |
| M-40 | I | II | III-2 | IV-5 |
| M-41 | I | II | III-2 | IV-6 |
| M-42 | I | II | III-2 | IV-7 |
| M-43 | I | II | III-2 | IV-8 |
| M-44 | I | II | III-2 | IV-9 |
| M-45 | I | II | III-2 | IV-10 |
| M-46 | I | II | III-2 | IV-11 |
| M-47 | I | II | III-2 | IV-12 |
| M-48 | I | II | III-2 | IV-13 |
| M-49 | I | II | III-2 | IV-14 |
| M-50 | I | II | III-2 | IV-15 |
| M-51 | I | II | III-2 | IV-16 |
| M-52 | I | II | III-2 | IV-17 |
| M-53 | I | II | III-2 | IV-18 |
| M-54 | I | II | III-2 | IV-19 |
| M-55 | I | II | III-2 | IV-20 |
| M-56 | I | II | III-2 | IV-21 |
| M-57 | I | II | III-2 | IV-22 |
| M-58 | I | II | III-2 | IV-23 |
| M-59 | I | II | III-2 | IV-24 |
| M-60 | I | II | III-3 | IV-1 |
| M-61 | I | II | III-3 | IV-2 |
| M-62 | I | II | III-3 | IV-3 |
| M-63 | I | II | III-3 | IV-4 |
| M-64 | I | II | III-3 | IV-5 |
| M-65 | I | II | III-3 | IV-6 |
| M-66 | I | II | III-3 | IV-7 |
| M-67 | I | II | III-3 | IV-8 |
| M-68 | I | II | III-3 | IV-9 |
| M-69 | I | II | III-3 | IV-10 |
| M-70 | I | II | III-3 | IV-11 |
| M-71 | I | II | III-3 | IV-12 |
| M-72 | I | II | III-3 | IV-13 |
| M-73 | I | II | III-3 | IV-14 |
| M-74 | I | II | III-3 | IV-15 |
| M-75 | I | II | III-3 | IV-16 |
| M-76 | I | II | III-3 | IV-17 |
| M-77 | I | II | III-3 | IV-18 |
| M-78 | I | II | III-3 | IV-19 |
| M-79 | I | II | III-3 | IV-20 |
| M-80 | I | II | III-3 | IV-21 |
| M-81 | I | II | III-3 | IV-22 |
| M-82 | I | II | III-3 | IV-23 |
| M-83 | I | II | III-3 | IV-24 |
| M-84 | I | II | III-4 | IV-1 |
| M-85 | I | II | III-4 | IV-2 |
| M-86 | I | II | III-4 | IV-3 |
| M-87 | I | II | III-4 | IV-4 |
| M-88 | I | II | III-4 | IV-5 |
| M-89 | I | II | III-4 | IV-6 |
| M-90 | I | II | III-4 | IV-7 |
| M-91 | I | II | III-4 | IV-8 |
| M-92 | I | II | III-4 | IV-9 |
| M-93 | I | II | III-4 | IV-10 |
| M-94 | I | II | III-4 | IV-11 |
| M-95 | I | II | III-4 | IV-12 |
| M-96 | I | II | III-4 | IV-13 |
| M-97 | I | II | III-4 | IV-14 |
| M-98 | I | II | III-4 | IV-15 |
| M-99 | I | II | III-4 | IV-16 |
| M-100 | I | II | III-4 | IV-17 |
| M-101 | I | II | III-4 | IV-18 |
| M-102 | I | II | III-4 | IV-19 |
| M-103 | I | II | III-4 | IV-20 |
| M-104 | I | II | III-4 | IV-21 |
| M-105 | I | II | III-4 | IV-22 |
| M-106 | I | II | III-4 | IV-23 |
| M-107 | I | II | III-4 | IV-24 |
| M-108 | I | II | III-5 | IV-1 |
| M-109 | I | II | III-5 | IV-2 |
| M-110 | I | II | III-5 | IV-3 |
| M-111 | I | II | III-5 | IV-4 |
| M-112 | I | II | III-5 | IV-5 |
| M-113 | I | II | III-5 | IV-6 |
| M-114 | I | II | III-5 | IV-7 |
| M-115 | I | II | III-5 | IV-8 |
| M-116 | I | II | III-5 | IV-9 |
| M-117 | I | II | III-5 | IV-10 |
| M-118 | I | II | III-5 | IV-11 |
| M-119 | I | II | III-5 | IV-12 |
| M-120 | I | II | III-5 | IV-13 |
| M-121 | I | II | III-5 | IV-14 |
| M-122 | I | II | III-5 | IV-15 |
| M-123 | I | II | III-5 | IV-16 |
| M-124 | I | II | III-5 | IV-17 |
| M-125 | I | II | III-5 | IV-18 |
| M-126 | I | II | III-5 | IV-19 |
| M-127 | I | II | III-5 | IV-20 |
| M-128 | I | II | III-5 | IV-21 |
| M-129 | I | II | III-5 | IV-22 |
| M-130 | I | II | III-5 | IV-23 |
| M-131 | I | II | III-5 | IV-24 |
| M-132 | I | II | III-6 | IV-1 |
| M-133 | I | II | III-6 | IV-2 |
| M-134 | I | II | III-6 | IV-3 |
| M-135 | I | II | III-6 | IV-4 |
| M-136 | I | II | III-6 | IV-5 |
| M-137 | I | II | III-6 | IV-6 |
| M-138 | I | II | III-6 | IV-7 |
| M-139 | I | II | III-6 | IV-8 |
| M-140 | I | II | III-6 | IV-9 |
| M-141 | I | II | III-6 | IV-10 |
| M-142 | I | II | III-6 | IV-11 |
| M-143 | I | II | III-6 | IV-12 |
| M-144 | I | II | III-6 | IV-13 |
| M-145 | I | II | III-6 | IV-14 |
| M-146 | I | II | III-6 | IV-15 |
| M-147 | I | II | III-6 | IV-16 |
| M-148 | I | II | III-6 | IV-17 |
| M-149 | I | II | III-6 | IV-18 |
| M-150 | I | II | III-6 | IV-19 |
| M-151 | I | II | III-6 | IV-20 |
| M-152 | I | II | III-6 | IV-21 |
| M-153 | I | II | III-6 | IV-22 |
| M-154 | I | II | III-6 | IV-23 |
| M-155 | I | II | III-6 | IV-24 |
| M-156 | I | II | III-7 | IV-1 |
| M-157 | I | II | III-7 | IV-2 |
| M-158 | I | II | III-7 | IV-3 |
| M-159 | I | II | III-7 | IV-4 |
| M-160 | I | II | III-7 | IV-5 |
| M-161 | I | II | III-7 | IV-6 |
| M-162 | I | II | III-7 | IV-7 |
| M-163 | I | II | III-7 | IV-8 |
| M-164 | I | II | III-7 | IV-9 |
| M-165 | I | II | III-7 | IV-10 |
| M-166 | I | II | III-7 | IV-11 |
| M-167 | I | II | III-7 | IV-12 |
| M-168 | I | II | III-7 | IV-13 |
| M-169 | I | II | III-7 | IV-14 |
| M-170 | I | II | III-7 | IV-15 |
| M-171 | I | II | III-7 | IV-16 |
| M-172 | I | II | III-7 | IV-17 |
| M-173 | I | II | III-7 | IV-18 |
| M-174 | I | II | III-7 | IV-19 |
| M-175 | I | II | III-7 | IV-20 |
| M-176 | I | II | III-7 | IV-21 |
| M-177 | I | II | III-7 | IV-22 |

TABLE 2-continued

| No | I | II | III | IV |
|---|---|---|---|---|
| M-178 | I | II | III-7 | IV-23 |
| M-179 | I | II | III-7 | IV-24 |
| M-180 | I | II | III-8 | IV-1 |
| M-181 | I | II | III-8 | IV-2 |
| M-182 | I | II | III-8 | IV-3 |
| M-183 | I | II | III-8 | IV-4 |
| M-184 | I | II | III-8 | IV-5 |
| M-185 | I | II | III-8 | IV-6 |
| M-186 | I | II | III-8 | IV-7 |
| M-187 | I | II | III-8 | IV-8 |
| M-188 | I | II | III-8 | IV-9 |
| M-189 | I | II | III-8 | IV-10 |
| M-190 | I | II | III-8 | IV-11 |
| M-191 | I | II | III-8 | IV-12 |
| M-192 | I | II | III-8 | IV-13 |
| M-193 | I | II | III-8 | IV-14 |
| M-194 | I | II | III-8 | IV-15 |
| M-195 | I | II | III-8 | IV-16 |
| M-196 | I | II | III-8 | IV-17 |
| M-197 | I | II | III-8 | IV-18 |
| M-198 | I | II | III-8 | IV-19 |
| M-199 | I | II | III-8 | IV-20 |
| M-200 | I | II | III-8 | IV-21 |
| M-201 | I | II | III-8 | IV-22 |
| M-202 | I | II | III-8 | IV-23 |
| M-203 | I | II | III-8 | IV-24 |
| M-204 | I | II | III-9 | IV-1 |
| M-205 | I | II | III-9 | IV-2 |
| M-206 | I | II | III-9 | IV-3 |
| M-207 | I | II | III-9 | IV-4 |
| M-208 | I | II | III-9 | IV-5 |
| M-209 | I | II | III-9 | IV-6 |
| M-210 | I | II | III-9 | IV-7 |
| M-211 | I | II | III-9 | IV-8 |
| M-212 | I | II | III-9 | IV-9 |
| M-213 | I | II | III-9 | IV-10 |
| M-214 | I | II | III-9 | IV-11 |
| M-215 | I | II | III-9 | IV-12 |
| M-216 | I | II | III-9 | IV-13 |
| M-217 | I | II | III-9 | IV-14 |
| M-218 | I | II | III-9 | IV-15 |
| M-219 | I | II | III-9 | IV-16 |
| M-220 | I | II | III-9 | IV-17 |
| M-221 | I | II | III-9 | IV-18 |
| M-222 | I | II | III-9 | IV-19 |
| M-223 | I | II | III-9 | IV-20 |
| M-224 | I | II | III-9 | IV-21 |
| M-225 | I | II | III-9 | IV-22 |
| M-226 | I | II | III-9 | IV-23 |
| M-227 | I | II | III-9 | IV-24 |
| M-228 | I | II | III-10 | IV-1 |
| M-229 | I | II | III-10 | IV-2 |
| M-230 | I | II | III-10 | IV-3 |
| M-231 | I | II | III-10 | IV-4 |
| M-232 | I | II | III-10 | IV-5 |
| M-233 | I | II | III-10 | IV-6 |
| M-234 | I | II | III-10 | IV-7 |
| M-235 | I | II | III-10 | IV-8 |
| M-236 | I | II | III-10 | IV-9 |
| M-237 | I | II | III-10 | IV-10 |
| M-238 | I | II | III-10 | IV-11 |
| M-239 | I | II | III-10 | IV-12 |
| M-240 | I | II | III-10 | IV-13 |
| M-241 | I | II | III-10 | IV-14 |
| M-242 | I | II | III-10 | IV-15 |
| M-243 | I | II | III-10 | IV-16 |
| M-244 | I | II | III-10 | IV-17 |
| M-245 | I | II | III-10 | IV-18 |
| M-246 | I | II | III-10 | IV-19 |
| M-247 | I | II | III-10 | IV-20 |
| M-248 | I | II | III-10 | IV-21 |
| M-249 | I | II | III-10 | IV-22 |
| M-250 | I | II | III-10 | IV-23 |
| M-251 | I | II | III-10 | IV-24 |
| M-252 | I | II | III-11 | IV-1 |
| M-253 | I | II | III-11 | IV-2 |
| M-254 | I | II | III-11 | IV-3 |
| M-255 | I | II | III-11 | IV-4 |
| M-256 | I | II | III-11 | IV-5 |
| M-257 | I | II | III-11 | IV-6 |
| M-258 | I | II | III-11 | IV-7 |
| M-259 | I | II | III-11 | IV-8 |
| M-260 | I | II | III-11 | IV-9 |
| M-261 | I | II | III-11 | IV-10 |
| M-262 | I | II | III-11 | IV-11 |
| M-263 | I | II | III-11 | IV-12 |
| M-264 | I | II | III-11 | IV-13 |
| M-265 | I | II | III-11 | IV-14 |
| M-266 | I | II | III-11 | IV-15 |
| M-267 | I | II | III-11 | IV-16 |
| M-268 | I | II | III-11 | IV-17 |
| M-269 | I | II | III-11 | IV-18 |
| M-270 | I | II | III-11 | IV-19 |
| M-271 | I | II | III-11 | IV-20 |
| M-272 | I | II | III-11 | IV-21 |
| M-273 | I | II | III-11 | IV-22 |
| M-274 | I | II | III-11 | IV-23 |
| M-275 | I | II | III-11 | IV-24 |
| M-276 | I | II | III-10 | IV-1 + IV-12 |
| M-277 | I | II | III-10 | IV-1 + IV-13 |
| M-278 | I | II | III-10 | IV-1 + IV-14 |
| M-279 | I | II | III-10 | IV-1 + IV-15 |
| M-280 | I | II | III-10 | IV-1 + IV-16 |
| M-281 | I | II | III-10 | IV-1 + IV-17 |
| M-282 | I | II | III-10 | IV-1 + IV-18 |
| M-283 | I | II | III-10 | IV-2 + IV-12 |
| M-284 | I | II | III-10 | IV-2 + IV-13 |
| M-285 | I | II | III-10 | IV-2 + IV-14 |
| M-286 | I | II | III-10 | IV-2 + IV-15 |
| M-287 | I | II | III-10 | IV-2 + IV-16 |
| M-288 | I | II | III-10 | IV-2 + IV-17 |
| M-289 | I | II | III-10 | IV-2 + IV-18 |
| M-290 | I | II | III-10 | IV-3 + IV-12 |
| M-291 | I | II | III-10 | IV-3 + IV-13 |
| M-292 | I | II | III-10 | IV-3 + IV-14 |
| M-293 | I | II | III-10 | IV-3 + IV-15 |
| M-294 | I | II | III-10 | IV-3 + IV-16 |
| M-295 | I | II | III-10 | IV-3 + IV-17 |
| M-296 | I | II | III-10 | IV-3 + IV-18 |
| M-297 | I | II | III-10 | IV-4 + IV-12 |
| M-298 | I | II | III-10 | IV-4 + IV-13 |
| M-299 | I | II | III-10 | IV-4 + IV-14 |
| M-300 | I | II | III-10 | IV-4 + IV-15 |
| M-301 | I | II | III-10 | IV-4 + IV-16 |
| M-302 | I | II | III-10 | IV-4 + IV-17 |
| M-303 | I | II | III-10 | IV-4 + IV-18 |
| M-304 | I | II | III-10 | IV-5 + IV-12 |
| M-305 | I | II | III-10 | IV-5 + IV-13 |
| M-306 | I | II | III-10 | IV-5 + IV-14 |
| M-307 | I | II | III-10 | IV-5 + IV-15 |
| M-308 | I | II | III-10 | IV-5 + IV-16 |
| M-309 | I | II | III-10 | IV-5 + IV-17 |
| M-310 | I | II | III-10 | IV-5 + IV-18 |
| M-311 | I | II | III-11 | IV-1 + IV-12 |
| M-312 | I | II | III-11 | IV-1 + IV-13 |
| M-313 | I | II | III-11 | IV-1 + IV-14 |
| M-314 | I | II | III-11 | IV-1 + IV-15 |
| M-315 | I | II | III-11 | IV-1 + IV-16 |
| M-316 | I | II | III-11 | IV-1 + IV-17 |
| M-317 | I | II | III-11 | IV-1 + IV-18 |
| M-318 | I | II | III-11 | IV-2 + IV-12 |
| M-319 | I | II | III-11 | IV-2 + IV-13 |
| M-320 | I | II | III-11 | IV-2 + IV-14 |
| M-321 | I | II | III-11 | IV-2 + IV-15 |
| M-322 | I | II | III-11 | IV-2 + IV-16 |
| M-323 | I | II | III-11 | IV-2 + IV-17 |
| M-324 | I | II | III-11 | IV-2 + IV-18 |
| M-325 | I | II | III-11 | IV-3 + IV-12 |
| M-326 | I | II | III-11 | IV-3 + IV-13 |
| M-327 | I | II | III-11 | IV-3 + IV-14 |
| M-328 | I | II | III-11 | IV-3 + IV-15 |
| M-329 | I | II | III-11 | IV-3 + IV-16 |
| M-330 | I | II | III-11 | IV-3 + IV-17 |
| M-331 | I | II | III-11 | IV-3 + IV-18 |
| M-332 | I | II | III-11 | IV-4 + IV-12 |
| M-333 | I | II | III-11 | IV-4 + IV-13 |

TABLE 2-continued

| No | I | II | III | IV |
|---|---|---|---|---|
| M-334 | I | II | III-11 | IV-4 + IV-14 |
| M-335 | I | II | III-11 | IV-4 + IV-15 |
| M-336 | I | II | III-11 | IV-4 + IV-16 |
| M-337 | I | II | III-11 | IV-4 + IV-17 |
| M-338 | I | II | III-11 | IV-4 + IV-18 |
| M-339 | I | II | III-11 | IV-5 + IV-12 |
| M-340 | I | II | III-11 | IV-5 + IV-13 |
| M-341 | I | II | III-11 | IV-5 + IV-14 |
| M-342 | I | II | III-11 | IV-5 + IV-15 |
| M-343 | I | II | III-11 | IV-5 + IV-16 |
| M-344 | I | II | III-11 | IV-5 + IV-17 |
| M-345 | I | II | III-11 | IV-5 + IV-18 |

Thus, more preferred are mixtures are M-1, M-2, M-3, M-4, M-5, M-6, M-7, M-8, M-9, M-10, M-11, M-12, M-13, M-14, M-15, M-16, M-17, M-18, M-19, M-20, M-21, M-22, M-23, M-24, M-25, M-26, M-27, M-28, M-29, M-30, M-31, M-32, M-33, M-34, M-35, M-36, M-37, M-38, M-39, M-40, M-41, M-42, M-43, M-44, M-45, M-46, M-47, M-48, M-49, M-50, M-51, M-52, M-53, M-54, M-55, M-56, M-57, M-58, M-59, M-228, M-229, M-230, M-231, M-232, M-233, M-234, M-235, M-236, M-237, M-238, M-239, M-240, M-241, M-242, M-243, M-244, M-245, M-246, M-247, M-248, M-249, M-250, M-251, M-252, M-253, M-254, M-255, M-256, M-257, M-258, M-259, M-260, M-261, M-262, M-263, M-264, M-265, M-266, M-267, M-268, M-269, M-270, M-271, M-272, M-273, M-274, M-275, M-276, M-277, M-278, M-279, M-280, M-281, M-282, M-283, M-284, M-285, M-286, M-287, M-288, M-289, M-290, M-291, M-292, M-293, M-294, M-295, M-296, M-297, M-298, M-299, M-300, M-301, M-302, M-303, M-304, M-305, M-306, M-307, M-308, M-309, M-310, M-311, M-312, M-313, M-314, M-315, M-316, M-317, M-318, M-319, M-320, M-321, M-322, M-323, M-324, M-325, M-326, M-327, M-328, M-329, M-330, M-331, M-332, M-333, M-334, M-335, M-336, M-337, M-338, M-339, M-340, M-341, M-342, M-343, M-344 and M-345.

Most preferred are mixtures M-10, M-11, M-228, M-229, M-230, M-231, M-232, M-233, M-234, M-235, M-236, M-237, M-238, M-239, M-240, M-241, M-242, M-243, M-244, M-245, M-248, M-250, M-251, M-252, M-253, M-254, M-255, M-256, M-257, M-258, M-259, M-260, M-261, M-262, M-263, M-264, M-265, M-266, M-267, M-268, M-269, M-272, M-274, M-275, M-276, M-277, M-278, M-279, M-280, M-281, M-282, M-283, M-284, M-285, M-286, M-287, M-288, M-289, M-290, M-291, M-292, M-293, M-294, M-295, M-296, M-297, M-298, M-299, M-300, M-301, M-302, M-303, M-304, M-305, M-306, M-307, M-308, M-309, M-310, M-311, M-312, M-313, M-314, M-315, M-316, M-317, M-318, M-319, M-320, M-321, M-322, M-323, M-324, M-325, M-326, M-327, M-328, M-329, M-330, M-331, M-332, M-333, M-334, M-335, M-336, M-337, M-338, M-339, M-340, M-341, M-342, M-343, M-344 and M-345.

All above-referred mixtures are herein below referred to as "inventive mixtures".

The inventive mixtures can further contain one or more insecticides, fungicides, herbicides.

The inventive mixtures can be converted into customary types of agrochemical mixtures, e. g. solutions, emulsions, suspensions, dusts, powders, pastes, granules, pressings, capsules, and mixtures thereof. Examples for mixture types are suspensions (e.g. SC, OD, FS), emulsifiable concentrates (e.g. EC), emulsions (e.g. EW, EO, ES, ME), capsules (e.g. CS, ZC), pastes, pastilles, wetable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further mixtures types are defined in the "Catalogue of pesticide formulation types and international coding system", Technical Monograph No. 2, 6$^{th}$ Ed. May 2008, CropLife International.

The mixtures are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the inventive mixtures on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for mixture types and their preparation are:
i) Water-Soluble Concentrates (SL, LS)

10-60 wt % of an inventive mixture and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible Concentrates (DC)

5-25 wt % of an inventive mixture and 1-10 wt % dispersant (e. g. polyvinylpyrrolidone) are dissolved in organic solvent (e.g. cyclohexanone) ad 100 wt %. Dilution with water gives a dispersion.

iii) Emulsifiable Concentrates (EC)

15-70 wt % of an inventive mixture and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of an inventive mixture and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of an inventive mixture are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type mixture up to 40 wt % binder (e.g. polyvinylalcohol) is added.

vi) Water-Dispersible Granules and Water-Soluble Granules (WG, SG)

50-80 wt % of an inventive mixture are ground finely with addition of dispersants and wetting agents (e.g. sodium lignosulfonate and alcohol ethoxylate) ad 100 wt % and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of an inventive mixture are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of an inventive mixture are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

ix) Microemulsion (ME)

5-20 wt % of an inventive mixture are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamicallystable microemulsion.

x) Microcapsules (CS)

An oil phase comprising 5-50 wt % of an inventive mixture, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of an inventive mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS mixture.

xi) Dustable Powders (DP, DS)

1-10 wt % of an inventive mixture are ground finely and mixed intimately with solid carrier (e.g. finely divided kaolin) ad 100 wt %.

x) Granules (GR, FG)

0.5-30 wt % of an inventive mixture is ground finely and associated with solid carrier (e.g. silicate) ad 100 wt %. Granulation is achieved by extrusion, spray-drying or fluidized bed.

xii) Ultra-Low Volume Liquids (UL)

1-50 wt % of an inventive mixture are dissolved in organic solvent (e.g. aromatic hydrocarbon) ad 100 wt %.

The mixtures types i) to xii) may optionally comprise further auxiliaries, such as 0.1-1 wt % bactericides, 5-15 wt % anti-freezing agents, 0.1-1 wt % anti-foaming agents, and 0.1-1 wt % colorants.

The resulting agrochemical mixtures generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds.

The mixtures in question give, after two-to-tenfold dilution, active substance concentrations of from 0.01 to 60% by weight, preferably from 0.1 to 40%, in the ready-to-use preparations. Application can be carried out before or during sowing. Methods for applying the inventive mixtures and mixtures thereof, respectively, on to plant propagation material, especially seeds include dressing, coating, pelleting, dusting, soaking and in-furrow application methods of the propagation material. Preferably, the inventive mixtures or the mixtures thereof, respectively, are applied on to the plant propagation material by a method such that germination is not induced, e. g. by seed dressing, pelleting, coating and dusting.

Various types of oils, wetters, adjuvants, fertilizer, or micronutrients, and further pesticides (e.g. herbicides, insecticides, fungicides, growth regulators, safeners) may be added to the active substances or the inventive mixtures comprising them as premix or, if appropriate not until immediately prior to use (tank mix). These agents can be admixed with the inventive mixtures in a weight ratio of 1:100 to 100:1, preferably 1:10 to 10:1.

The user applies the mixture according to the invention usually from a predosage device, a knapsack sprayer, a spray tank, a spray plane, or an irrigation system. Usually, the agrochemical mixture is made up with water, buffer, and/or further auxiliaries to the desired application concentration and the ready-to-use spray liquor or the agrochemical mixture according to the invention is thus obtained. Usually, 20 to 2000 liters, preferably 50 to 400 liters, of the ready-to-use spray liquor are applied per hectare of agricultural useful area.

The inventive mixtures provide excellent pre- and post-emergence control of weeds in HPPD tolerant soybeans and cotton. Thus, in the methods and uses of the invention, the compounds present in the inventive mixtures can be applied for pre-emergence (before the emergence of undesirable vegetation) or post-emergence (i.e., during and/or after emergence of the undesirable vegetation).

Thus, the invention relates to a method of an inventive mixture for controlling undesirable vegetation in HPPD tolerant soybeans and cotton, which comprises applying the compounds present in the inventive mixtures to a locus of planted crops where undesirable vegetation occurs or might occur. The application is done before the emergence of undesirable vegetation or during and/or after emergence of the undesirable vegetation.

The application can be done after seeding of the soybeans or during and/or after emergence of the soybeans.

The term "locus", as used herein, means the area in which the vegetation or plants are growing or will grow, typically a field.

As used herein, the terms "controlling" and "combating" are synonyms.

As used herein, the terms "undesirable vegetation", "undesirable species", "undesirable plants", "harmful plants", "undesirable weeds", or "harmful weeds" are synonyms.

When using the inventive mixtures in the methods of the present invention, the active compounds present in the inventive mixtures can be applied simultaneously or in succession, where undesirable vegetation may occur. Herein, it is immaterial whether compounds present in the inventive mixtures are formulated jointly or separately and applied jointly or separately, and, in the case of separate application, in which order the application takes place. It is only necessary, that the compounds present in the inventive mixtures are applied in a time frame, which allows simultaneous action of the active ingredients on the undesirable plants.

In the above-mentioned methods of controlling weeds by application of the inventive mixtures, the inventive mixtures have an outstanding herbicidal activity against a broad spectrum of economically important monocotyledonous and dicotyledonous harmful plants. The inventive mixtures also act efficiently on perennial weeds which produce shoots from rhizomes, rootstocks or other perennial organs and which are difficult to control. In this context, it does not matter whether the compounds of the inventive mixtures are applied before sowing, pre-emergence or post-emergence. Pre-emergence application is preferred.

The inventive mixtures are suitable for controlling a large number of harmful plants in agricultural crops, including monocotyledonous weeds, in particular annual weeds such as gramineous weeds (grasses) including *Echinochloa* species such as barnyardgrass (*Echinochloa crusgalli* var. *crusgalli*), *Echinchloa walteri* (Pursh) Heller, jungle rice (*Echinochloa colona*), *Echinochloa crus-pavonis*, *Echinochloa oryzicola*, *Digitaria* species such as crabgrass (*Digitaria sanguinalis*), *Digitaria horizontalis*, sourgrass (*Digitaria insularis*) or naked crabgrass (*Digitaria nuda*), *Setaria* species such as green foxtail (*Setaria viridis*), giant foxtail (*Setaria faberii*), yellow foxtail (*Setaria glauca* or *Setaria pumila*) or *Setaria verticillata*, *Sorghum* species such as johnsongrass (*Sorghum halepense* Pers.), *Avena* species such as wild oats (*Avena fatua*), *Avena sterillis* or *Avena strigosa*, *Cenchrus* species such as *Cenchrus* species such as field sandbur (*Cenchrus pauciflorus*) or *Cenchrus echinatus*, *Bromus* species such as *Bromus japonicus* Thunb, *Bromus sterilis* or *Bromus tectorum*, *Lolium* species, *Phalaris* species such as *Phalaris brachystachys*, *Phalaris minor* or *Phalaris persicaria*, *Eriochloa species*, *Panicum* species such as fall *Panicum* (*Panicum dichotomiflorum*), *Panicum fasciculatum* or *Panicum maximum*, *Brachiaria* species, annual bluegrass (*Poa annua*), *Alopecurus* species such as blackgrass (*Alopecurus myosuroides*), *Alopecurus aequalis*

Sobol or *Alopecurus japonicus* Steud, *Aegilops* species such as *Aegilops cylindrica* or *Aegylops tauschii*, *Apera spicaventi*, *Eleusine indica*, *Cynodon dactylon*, couch grass (*Agropyron repens* or *Elymus repens*), *Agrostis alba*, *Beckmannia syzigachne* (Steud.) Fernald, *Chloris* species such as *Chloris virgata*, *Commelina* species such as *Commelina benghalensis*, *Commelina communis*, *Commelina diffusa* or *Commelina erecta*, *Dactyloctenium aegyptium*, *Hordeum jubatum*, *Hordeum leporinum*, *Imperata cylindrica*, *Ischaemum rogusum*, *Ixophorus unisetus*, *Leerisa hexandra*, *Leersia japonica*, *Leptochloa* species such as *Leptochloa chinensis*, *Leptochloa fascicularis*, *Leptochloa filiformis* or *Leptochloa panicoides*, *Lolium* species such as *Lolium multiflorum*, *Lolium perenne*, *Lolium persicum* or rigid ryegrass (*Lolium rigidum*), *Luziola subintegra*, *Murdannia nudiflora* (L.) Brenan, *Oryza latifolia*, *Oryza rufipogon*, *Paspalum distichum*, *Paspalum* species, *Pennisetum americanum*, *Pennisetum purpureum*, *Phleum paniculatum*, *Phragmites australia*, *Ploypogon fugax*. N., *Poa* species such as *Poa annua* or *Poa trivialis* L., *Puccinellia distans*, *Rottboellia cochinchinensis*, *Sclerochloa kengiana* (Ohwi) Tzvel., *Trichloris crinita*, *Urochloa* or *Brachiaria* species such as *Brachiaria decumbens*, *Brachiaria plantaginea*, *Brachiaria platyphylla*, *Urochloa panicoides*, *Urochloa ramosa* and the like.

The inventive mixtures are also suitable for controlling a large number of dicotyledonous weeds, in particular broad leaf weeds including *Polygonum* species such as wild buckwheat (*Polygonum convolvolus*), *Polygonum pensilvanicum*, *Polygonum persicaria* or prostrate knotweed (*Polygonum aviculare*), *Amaranthus* species such as pigweed (*Amaranthus retroflexus*), Palmer amaranth (*Amaranthus palmeri*), tall waterhemp (*Amaranthus tuberculatus* or *Amaranthus rudis*), redroot pigweed (*Amaranthus retroflexus*), green amaranth (*Amaranthus hybridus*), purple amaranth (*Amaranthus lividus*), prickly amaranth (*Amaranthus spinosus*) or *Amaranthus quitensis*, *Chenopodium* species such as common lambsquarters (*Chenopodium album* L.), *Chenopodium serotinum* or *quinoa* (*Chenopodium quinoa*), *Sida* species such as prickly sida (*Sida spinosa* L.), *Ambrosia* species such as common ragweed (*Ambrosia artemisiifolia*) or giant ragweed (*Ambrosia trifida*), *Acanthospermum* species, *Anthemis* species such as *Anthemis arvensis* or *Anthemis cotula*, *Atriplex species*, *Cirsium* species such as *Cirsium arvense*, *Convolvulus* species such as field bindweed (*Convolvulus arvensis*), *Conyza* species such as horseweed (*Conyza canadensis*, *Erigeron canadensis*) or hairy fleabane (*Conyza bonariensis*, *Erigeron bonariensis*), *Cassia* species, *Datura* species such as jimsonweed (*Datura stramonium*), *Euphorbia* species such as toothed spurge (*Euphorbia dentata*), *Euphorbia hirta*, *Euphorbia helioscopia* or fireplant (*Euphorbia heterophylla*), *Geranium* species such as *Geranium donianum* or *Geranium pusillum*, *Galinsoga* species, morningglory (*Ipomoea* species), *Lamium* species such as henbit dead-nettle (*Lamium amplexicaule*), *Malva* species such as dwarf mallow (*Malva neglecta*) or cheeseweed (*Malwa parviflora*), *Matricaria* species such as chamomile (*Matricaria chamomilla*) or *Matricaria inodora*, *Sysimbrium* species, *Solanum* species such as black nightshade (*Solanum nigrum*), *Xanthium* species, *Veronica* species such as *Veronica polita*, *Viola* species, common chickweed (*Stellaria media*), velvetleaf (*Abutilon theophrasti*), *Sesbania* species such as *Sesbania exaltata*, *Sesbania herbacea* or hemp *sesbania* (*Sesbania exaltata* Cory), *Anoda cristata*, *Bidens* species such as *Bidens frondosa* or *Bidens pilosa*, *Brassica kaber*, *Capsella* species such as *Capsella* media or *Capsella bursa-pastoris*, *Centaurea cyanus*, *Galeopsis tetrahit*, *Galium aparine*, *Helianthus annuus*, *Desmodium tortuosum*, *Kochia scoparia*, *Mercurialis annua*, *Myosotis arvensis*, *Papaver rhoeas*, *Raphanus* species such as wild radish (*Raphanus raphanistrum*), *Salsola* species such as *Salsola tragus* or *Salsola kali*, *Sinapis arvensis*, *Sonchus* species such a *Sonchus asper*, *Sonchus arvensis* or *Sonchus oleraceus*, *Thlaspi arvense*, *Tagetes minuta*, *Richardia* species such as *Richardia scabra* or *Richardia brasiliensis*, *Aeschynomeme* species such as *Aeschynomene denticulata*, *Aeschynomene indica* or *Aeschynomene rudis*, *Alisma* species such as *Alisma canaliculatum* or *Alisma plantagoaquatica*, *Borreria* species such as *Borreria verticillata*, *Brassica rapa*, *Carduus acanthoides*, *Parietaria debilis*, *Portulaca oleracea*, *Ipomoea* species such as *Ipomoea grandifolia*, *Ipomoea hederacea*, *Ipomoea indivisa*, *Ipomoea lacunose*, *Ipomoea lonchophylla* or *Ipomoea wrightii*, *Senna obtusifolia*, *Sida* species such as arrowleaf sida (*Sida rhombifolia*) or prickly sida (*Sida spinosa*), *Spermacoce latifolia*, *Tridax procumbens*, *Trianthema portulacastrum*, *Parthenium hysterophorus*, *Portulaca oleracea*, *Acalypha australis*, *Ammi majus*, *Atriplex* species, *Orobanche* species, *Mercurialis annua*, *Cirsium arvense*, *Calystegia sepium*, *Stellaria media*, *Lamium* species, *Viola* species, *Celosia argentea*, *Melampodium divaricatum*, *Cleome viscosa*, *Molugo verticilatus*, *Borhevia erecta*, *Gomphrena* species, *Nicandra physalodes*, *Ricinus communis*, *Geranium dissectum*, *Alternanthera* species such as *Althernanthera philoxeroides* or *Alternanthera tenella*, *Ammannia* species such as *Ammania coccinea*, *Anacamtodon fortunei* Mitt., *Anagallis arvensis*, *Aneilema keisak*, *Arenaria serpyllifolia*, *Argemone mexicana*, *Asphodelus tenuifolius*, *Atriplex patula*, *Bacopa rotundifolia*, *Brassica napus*, *Caperonia* species such as *Caperonia castaneifolia* or *Caperonia palustris*, *Cephalanoplos segetum*, *Corynopus didymus*, *Crepis capillaris*, *Crepis tectorum*, *Croton lobatus*, *Descuminia sophia* (L.), *Descurainia pinnata*, *Echinodorus grandiflorus*, *Eclipta alba*, *Eclipta prostrata*, *Eichhornia crassipes*, *Eleocharis* species, *Equisetum arvense*, *Fallopia convolvulus*, *Fallopia convolvulus*, *Heteranthera limosa*, *Jussiaea* species, *Kallstroemia maxima*, *Lactuca serriola*, *Lathyrus aphaca*, *Launea mudicaulis*, *Leucas chinensis*, *Limnocharis flava*, *Lindernia dubia*, *Lindernia pyxidaria*, *Litospermum arvense*, *Ludwigia* species such as *Ludwigia octovallis*, *Macroptilium lathyroides*, *Malachium aquaticum* (L.), *Melilotus* species, *Merremia aegyptia*, *Momordica charantia*, *Monochoria hastate*, *Monochoria vaginalis*, *Mucuna* species, *Murdannia nudiflora*, *Oxalis neaei*, *Phylanthus* species, *Physalis* species, *Pistia stratiotes*, *Potamogeton distinctus*, *Rorippa islandica*, *Rotala indica*, *Rotala ramosior*, *Rumex dentatus*, *Rumex obtusifolius*, *Sagittaria montevidensis*, *Sagittaria pygmaea* Miq., *Sagittaria sagittifolia*, *Sagittaria trifolia* L., *Senecio vulgaris*, *Sicyos polyacanthus*, *Silene gallica*, chenopo *Sisymbrium* species such as *Sisymbrium oficinale*, *Solanum* species, *Spergula arvensis*, *Sphenoclea zeylanica*, *Trianthema* spp., *Tripleurospermum inodorum*, *Veronica* species such as *Veronica persica* or *Veronica polita Vicia sativa* and the like.

The inventive mixtures are also suitable for controlling a large number of annual and perennial sedge weeds including *Cyperus* species such as purple nutsedge (*Cyperus rotundus* L.), yellow nutsedge (*Cyperus esculentus* L.), hime-kugu (*Cyperus brevifolius* H.), sedge weed (*Cyperus microiria* Steud), rice flatsedge (*Cyperus iria* L.), *Cyperus difformis*, *Cyperus difformis* L., *Cyperus esculentus*, *Cyperus ferax*, *Cyperus flavus*, *Cyperus iria*, *Cyperus lanceolatus*, *Cyperus odoratus*, *Cyperus rotundus*, *Cyperus serotinus* Rottb., *Eleocharis acicularis*, *Eleocharis kuroguwai*, *Fimbristylis*

*dichotoma, Fimbristylis miliacea, Scirpus grossus, Scirpus juncoides, Scirpus juncoides* Roxb, *Scirpus* or *Bolboschoenus maritimus, Scirpus* or *Schoenoplectus mucronatus, Scirpus planiculmis* Fr. Schmidt and the like.

The inventive mixtures are also suitable for controlling weeds that are resistant to commonly used herbicides such as, for example, weeds that are resistant to glyphosate, weeds that are resistant to auxin inhibitor herbicides such as e. g. 2,4-D or dicamba, weeds that are resistant to photosynthesis inhibitors such as e. g. atrazine, weeds that are resistant to ALS inhibitors such as e. g. sulfonylureas, imidazolinones or triazolopyrimidines, weeds that are resistant to ACCase inhibitors such as e. g. clodinafop, clethodim or pinoxaden or weeds that are resistant to protoporphyrinogen-IX-oxidase inhibitors such as e. g. sulfentrazone, flumioxazine, fomesafen or acifluorfen, for example the weeds that are listed in the International Survey of Resistant Weeds (http://www.weedscience.org/Summary/SpeciesbySOATable.aspx). In particular, they are suitable for controlling the resistant weeds that are listed in the International Survey of Resistant Weeds, for example ACCase resistant *Echinochloa crus-galli, Avena fatua, Alopecurus myosuroides, Echinochloa colona, Alopecurus japonicus, Bromus tectorum, Hordeum murinum, Ischaemum rugosum, Setaria viridis, Sorghum halepense, Alopecurus aequalis, Apera spicaventi, Avena sterilis, Beckmannia szygachne, Bromus diandrus, Digitaria sanguinalis, Echinocloa oryzoides, Echinochloa phyllopogon, Phalaris minor, Phalaris paradoxa, Setaria faberi, Setaria viridis, Brachypodium distachyon, Bromus diandrus, Bromus sterilis, Cynosurus echinatus, Digitaria insularis, Digitaria ischaemum, Leptochloa chinensis, Phalaris brachystachis, Rotboellia cochinchinensis, Digitaria ciliaris, Ehrharta longiflora, Eriochloa punctata, Leptochloa panicoides, Lolium persicum, Polypogon fugax, Sclerochloa kengiana, Snowdenia polystacha, Sorghum sudanese* and *Brachiaria plantaginea*, ALS inhibitor resistant *Echinochloa crus-galli, Poa annua, Avena fatua, Alopecurus myosuroides, Echinochloa colona, Amaranthus hybridus, Amaranthus palmeri, Amaranthus rudis, Conyza sumatrensis, Amaranthus retroflexus, Ambrosia artemisifolia, Conyza canadensis, Kochia scoparia, Raphanus raphanistrum, Senecio vernalis, Alopecurus japonicus, Bidens pilosa, Bromus tectorum, Chenopodium album, Conyza bonariensis, Hordeum murinum, Ischaemum rugosum, Senecio vulgaris, Setaria viridis, Sisymbrium orientale, Sorghum halepense, Alopecurus aequalis, Amaranthus blitum, Amaranthus powellii, Apera spica-venti, Avena sterilis, Brassica rapa, Bromus diandrus, Descurainia sophia, Digitaria sanguinalis, Echinochloa oryzoides, Echinochloa phyllopogon, Euphorbia heterophylla, Lactuca serriola, Phalaris minor, Phalaris paradoxa, Setaria faberi, Setaria viridis, Sinapis arvensis, Solanum ptycanthum, Sonchus oleraceus, Stellaria media, Amaranthus blitoides, Amaranthus spinosus, Amaranthus viridis, Ambrosia trifida, Bidens subalternans, Bromus diandrus, Bromus sterilis, Capsella bursa-pastoris, Centaurea cyanus, Cynosurus echinatus, Cyperus difformis, Fimbristilis miliacea, Galeopsis tetrahit, Galium aparine, Galium spurium, Helianthus annuus, Hirschfeldia incana, Limnocharis flava, Limnophila erecta, Papaver rhoeas, Parthenium hysterophorus, Phalaris brachystachis, Polygonum convolvulus, Polygonum lapathifolium, Polygonum persicaria, Ranunculus acris, Rottboellia cochinchinensis, Sagittaria montevidensis, Salsola tragus, Schoenoplectus mucronatus, Ageratum pumila, Sonchus asper, Xanthium strumarium, Ageratum conyzoides, Alisma canaliculatum, Alisma plantago-aquatica, Ammannia auriculata, Ammannia coccinea, Ammannia arvensis, Anthemis cotula, Bacopa rotundifolia, Bifora radians, Blyxa aubertii, Brassica tournefortii, Bromus japonicus, Bromus secalinus, Lithospermum arvense, Camelina microcarpa, Chamaesyce maculata, Chrysanthemum coronarium, Clidemia hirta, Crepis tectorum, Cuscuta pentagona, Cyperus brevifolis, Cyperus compressus, Cyperus esculentus, Cyperus iria, Cyperus odoratus, Damasonium minus, Diplotaxis erucoides, Diplotaxis tenuifolia, Dopatrum junceum, Echium plantagineum, Elatine triandra, Eleocharis acicularis, Erucaria hispanica, Erysimum repandum, Galium tricornutum, Iva xanthifolia, Ixophorus unisetus, Lamium amplexicaule, Limnophilia sessiliflora, Lindernia dubia, Lindernia micrantha, Lindernia procumbens, Ludwigia prostrata, Matricaria recutita, Mesembryanthemum crystal-linum, Monochoria korsakowii, Monochoria vaginalis, Myosoton aquaticum, Neslia paniculata, Oryza sativa* var. *sylvatica, Pentzia suffruticosa, Picris hieracioides, Raphanus sativus, Rapistrum rugosum, Rorippa indica, Rotala indica, Rotala pusilla, Rumex dentatus, Sagittaria guayensis, Sagittaria pygmaea, Sagittaria trifolia, Schoenoplectus fluviatilis, Schoenoplectus juncoides, Schoenoplectus wallichii, Sida spinosa, Silene gallica, Sinapis alba, Sisymbrium thellungii, Sorghum bicolor, Spergula arvensis, Thlaspi arvense, Tripleurospermum perforatum, Vaccaria hispanica* and *Vicia sativa*, photosynthesis inhibitor resistant *Echinochloa crus-galli, Poa annua, Alopecurus myosuroides, Echinochloa colona, Amaranthus hybridus, Amaranthus palmeri, Amaranthus rudis, Conyza sumatrensis, Amaranthus retroflexus, Ambrosia artemisifolia, Conyza canadensis, Kochia scoparia, Raphanus raphanistrum, Senecio vernalis, Alopecurus japonicus, Bidens pilosa, Bromus tectorum, Chenopodium album, Conyza bonariensis, Ischaemum rugosum, Senecio vulgaris, Setaria viridis, Sisymbrium orientale, Amaranthus blitum, Amaranthus powellii, Apera spica-venti, Beckmannia syzigachne, Brassica rapa, Digitaria sanguinalis, Euphorbia heterophylla, Phalaris minor, Phalaris paradoxa, Setaria faberi, Setaria viridis, Sinapis arvensis, Solanum ptycanthum, Stellaria media, Amaranthus blitoides, Amaranthus viridis, Bidens subalternans, Brachypodium distachyon, Capsella bursa-pastoris, Chloris barbata, Cyperus difformis, Echinochloa erecta, Epilobium ciliatum, Polygonum aviculare, Polygonum convolvulus, Polygonum lapathifolium, Polygonum persicaria, Portulaca oleracea, Schoenoplectus mucronatus, Setaria pumila, Solanum nigrum, Sonchus asper, Urochloa panicoides, Vulpia bromoides, Abutilon theophrasti, Amaranthus albus, Amaranthus cruentus, Arabidopsis thaliana, Arenaria serpyllifolia, Bidens tripartita, Chenopodium album, Chenopodium ficifolium, Chenopodium polyspermum, Crypsis schoenoides, Datura stramonium, Epilobium tetragonum, Galinsoga ciliata, Matricaria discoidea, Panicum capillare, Panicum dichotomiflorum, Plantago lagopus, Polygonum hydopiper, Polygonum pensylvanicum, Polygonum monspeliensis, Rostraria, smyrnacea, Rumex acetosella, Setaria verticillata* and *Urtica urens*, PS-I-electron diversion inhibitor resistant *Poa annua, Conyza sumatrensis, Conyza canadensis, Alopecurus japonicus, Bidens pilosa, Conyza bonariensis, Hordeum murinum, Ischaemum rugosum, Amaranthus blitum, Solanum ptycanthum, Arctotheca calendula, Epilobium ciliatum, Hedyotis verticillata, Solanum nigrum, Vulpia bromoides, Convolvulus arvensis, Crassocephalum crepidioides, Cuphea carthagensis, Erigeron philadelphicus, Gamochaeta pensylvanica, Landoltia punctata, Lepidium virginicum, Mazus fauriei, Mazus pumilus, Mitracarpus hirtus, Sclerochloa dura, Solanum americanum* and *Youngia japonica*, glyphosate resistant *Poa annua, Echinochloa colona, Amaranthus hybridus*,

*Amaranthus palmeri, Amaranthus rudis, Conyza sumatrensis, Ambrosia artemisifolia, Conyza canadensis, Kochia scoparia, Raphanus raphanistrum, Bidens pilosa, Conyza bonariensis, Hordeum murinum, Sorghum halepense, Brassica rapa, Bromus diandrus, Lactuca serriola, Sonchus oleraceus, Amaranthus spinosus, Ambrosia trifida, Digitaria insularis, Hedyotis verticillata, Helianthus annuus, Parthenium hysterophorus, Plantago lanceolata, Salsola tragus, Urochloa panicoides, Brachiaria eruciformis, Bromus rubens, Chloris elata, Chloris truncata, Chloris virgata, Cynodon hirsutus, Lactuca saligna, Leptochloa virgata, Paspalum paniculatum* and *Tridax procumbens*, microtubule assembly inhibitor resistant *Echinochloa crusgalli, Poa annua, Avena fatua, Alopecurus myosuroides, Amaranthus palmeri, Setaria viridis, Sorghum halepense, Alopecurus aequalis, Beckmannia syzigachne* and *Fumaria densifloria*, auxin herbicide resistant *Echinochloa crus-galli, Echinochloa colona, Amaranthus hybridus, Amaranthus rudis, Conyza sumatrensis, Kochia scoparia, Raphanus raphanistrum, Chenopodim album, Sisymbrium orientale, Descurainia sophia, Lactuca serriola, Sinapis arvensis, Sonchus oleraceus, Stellaria media, Arctotheca calendula, Centaurea cyanus, Digitaria ischaemum, Fimbristylis miliacea, Galeopsis tetrahit, Galium aparine, Galium spurium, Hirschfeldia incana, Limnocharis flava, Limnocharis erecta, Papaver rhoeas, Plantago lanceolata, Ranunculus acris, Carduus nutans, Carduus pycnocephalus, Centaurea soltitialis, Centaurea stoebe* ssp. *Micranthos, Cirsium arvense, Commelina diffusa, Echinochloa crus-pavonis, Soliva sessilis* and *Sphenoclea zeylanica*, HPPD inhibitor resistant *Amaranthus palmeri* and *Amaranthus rudis*, PPO inhibitor resistant *Acalypha australis, Amaranthus hybridus, Amaranthus palmeri, Amaranthus retroflexus, Amaranthus rudis, Ambrosia artemisifolia, Avena fatua, Conyza sumatrensis, Descurainia sophia, Euphorbia heterophylla* and *Senecio vernalis*, carotenoid biosynthesis inhibitor resistant *Hydrilla verticillata, Raphanus raphanistrum, Senecio vernalis* and *Sisymbrium orientale*, VLCFA inhibitor resistant *Alopecurus myosuroides, Avena fatua* and *Echinochloa crus-galli*.

If the compounds of the inventive mixtures are applied to the soil surface before germination, then the weed seedlings are either prevented completely from emerging, or the weeds grow until they have reached the cotyledon stage but then their growth stops, and, eventually, after three to four weeks have elapsed, they die completely.

If the active compounds of the inventive mixtures are applied post-emergence to the green parts of the plants, growth likewise stops drastically a very short time after the treatment and the weed plants remain at the growth stage of the point of time of application, or they die completely after a certain time, so that in this manner competition by the weeds, which is harmful to the soybean plants, is eliminated at a very early point in time and in a sustained manner.

When the active compounds of the inventive mixtures are used jointly, superadditive (=synergistic) effects are observed. This means that the effect in the combinations exceeds the expected total of the effects of the individual herbicides employed. The synergistic effects allow the application rate to be reduced, a broader spectrum of broad-leaved weeds and weed grasses to be controlled, the herbicidal effect to take place more rapidly, the duration of action to be longer, the harmful plants to be controlled better while using only one, or few, applications, and the application period which is possible to be extended. In some cases, uptake of the compositions also reduces the amount of harmful constituents in the crop plant, such as nitrogen or oleic acid.

The active compounds of the inventive mixtures can be used jointly or in succession. They can also conveniently be combined with further herbicide treatments to treatment combinations that ensure a more complete or long-lasting weed control, or to ensure control of weeds that are resistant against certain herbicides through combined action of multiple herbicides with different modes of action.

In particular, the active compounds of the inventive mixtures and further herbicides can be used in any of the soybean treatment combinations outlined below that consist of pre-plant burn down, pre-emergence and post-emergence treatments. These treatment combinations can be particularly suitable if the soybean crop is, besides being HPPD tolerant, also tolerant to the action of one or more herbicides present in the treatment combination, including tolerance that is a result of breeding and/or genetic modification. Such tolerant plants include glufosinate tolerant soybeans, glyphosate tolerant soybeans and soybeans that are tolerant to auxin herbicides (e. g. 2,4-D, dicamba) and/or PPO herbicides (e. g. carfentrazone-ethyl, saflufenacil, sulfentrazone, trifludimoxazin, pyraflufen-ethyl, tiafenacil).

The following active compounds of the inventive mixtures and further herbicides are particularly suitable as pre-plant burn-down weed control components in such soybean treatment combinations: Glufosinate, glufosinate ammonium, glufosinate sodium, L-glufosinate, L-glufosinate ammonium, L-glufosinate sodium, glyphosate, glyphosate dimethylammonium, glyphosate potassium, glyphosate isopropylammonium, paraquat, tiafenacil, trifludimoxazin, saflufenacil, sulfentrazone, flumioxazin, fomesafen, carfentrazone-ethyl, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6, S-3100), cloransulam-methyl, chlorimuron-ethyl, imazethapyr, imazethapyr ammonium, 2,4-D, 2,4-D choline salt, dicamba, dicamba ethanolamine salt, dicamba diglycolamine salt, dicamba potassium and dicamba BAPMA salt (i. e. dicamba N,N-bis(3-aminopropyl)methylamine salt).

The following active compounds of the inventive mixtures and further herbicides are particularly suitable as pre-emergence weed control components in such soybean treatment combinations: isoxaflutole, pyroxasulfone, isoxaflutole/pyroxasulfone, isoxaflutole/pyroxasulfone/imazethapyr, isoxaflutole/pyroxasulfone/imazethapyr ammonium, isoxaflutole/pyroxasulfone/imazapic, isoxaflutole/pyroxasulfone/imazapic ammonium, isoxaflutole/pyroxasulfone/imazaquin, isoxaflutole/pyroxasulfone/imazaquin ammonium, isoxaflutole/mesotrione, isoxaflutole/mesotrione/pyroxasulfone, mesotrione/pyroxasulfone, pyroxasulfone/imazethapyr, isoxaflutole/imazethapyr, mesotrione/imazethapyr, acetochlor, metolachlor, (S)-metolachlor, dimethenamid, dimethenamid-P, pethoxamid, cloransulam-methyl, chlorimuron-ethyl, thifensulfuron-methyl, imazethapyr, imazethapyr ammonium, trifludimoxazin, saflufenacil, sulfentrazone, flumioxazin, fomesafen, trifluralin, pendimethalin, metribuzin, mesotrione, tembotrione, bicyclopyrone and fenquinotrione.

The following active compounds of the inventive mixtures and further herbicides are particularly suitable for post-emergence weed control components in such soybean treatment combinations: Glufosinate, glufosinate ammonium, glufosinate sodium, L-glufosinate, L-glufosinate ammonium, L-glufosinate sodium, glyphosate, glyphosate dimethylammonium, glyphosate potassium, glyphosate isopropylammonium, imazamox, imazamox ammonium, imazethapyr, imazethapyr ammonium, bentazone, bentazone sodium, isoxaflutole, topramezone, mesotrione, tolpyralate, isoxaflutole/mesotrione, isoxaflutole/topramezone, mesotrione/topramezone, isoxaflutole/tolpyralate, tembotrione, bicyclopyrone, fenquinotrione, carfentrazone-ethyl, saflufenacil, sulfentrazone, trifludimoxazin, saflufenacil/trifludimoxazin, pyraflufen-ethyl, tiafenacil, ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy] acetate (CAS 353292-31-6, S-3100), pyroxasulfone, isoxaflutole/pyroxasulfone, isoxaflutole/pyroxasulfone/imazethapyr, isoxaflutole/pyroxasulfone/imazethapyr ammonium, isoxaflutole/pyroxasulfone/imazamox, isoxaflutole/pyroxasulfone/imazamox ammonium, isoxaflutole/mesotrione/pyroxasulfone, mesotrione/pyroxasulfone, topramezone/pyroxasulfone, pyroxasulfone/imazamox, pyroxasulfone/imazamox ammonium, 2,4-D, 2,4-D choline salt, dicamba, dicamba ethanolamine salt, dicamba diglycolamine salt, dicamba potassium and dicamba BAPMA salt.

The abovementioned properties and advantages are necessary under practical weed control conditions to keep the soybeans or cotton free from undesired competing plants and thus to guarantee and/or increase the yields from the qualitative and quantitative point of view. These novel combinations markedly exceed the technical state of the art with a view to the properties described.

While the active compounds of the inventive mixtures have an outstanding herbicidal activity against monocotyledonous and dicotyledonous weeds, the tolerant, or cross-tolerant, glufosinate tolerant soybeans and cotton are damaged only to a minor extent, or not at all.

As mentioned above, the inventive mixtures are suitable for controlling a large number of harmful plants in HPPD tolerant soybeans and cotton.

Thus, the terms "HPPD tolerant soybeans" and "HPPD tolerant cotton" as used herein includes also (soybean or cotton) plants which have been modified by mutagenesis, genetic engineering or breeding and mutation selection techniques in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect. Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. HPPD tolerance has been created by using mutagenesis as well as using genetic engineering.

Transgenic soybean events comprising HPPD tolerance genes are for example, but not excluding others, FG72 (that confers tolerance to both HPPD inhibitors and glyphosate, commercially available as GT27® soybeans), FG72xLL55 (that confers tolerance to HPPD inhibitors such as isoxaflutole, and to glyphosate and glufosinate) and MGI (that confers tolerance to HPPD inhibitors such as isoxaflutole and mesotrione, and to glufosinate).

In other aspects, soybeans of the invention include those plants which have been subjected to genetic modifications other than HPPD tolerance by breeding, mutagenesis or genetic engineering, e.g. have been rendered tolerant to applications of specific other classes of herbicides, such as PPO inhibitors (e. g. saflufenacil, trifludimoxazin), AHAS inhibitors; auxinic herbicides such as dicamba or 2,4-D; bleaching herbicides such as hydroxyphenylpyruvate dioxygenase (HPPD) inhibitors (e. g. isoxaflutole, mesotrione, tembotrione, topramezone, bicyclopyrone) or phytoene desaturase (PDS) inhibitors; EPSPS inhibitors such as glyphosate; glutamine synthetase (GS) inhibitors such as glufosinate; lipid biosynthesis inhibitors such as acetyl CoA carboxylase (ACCase) inhibitors such as "dims" {e.g., cycloxydim, sethoxydim, clethodim, or tepraloxydim), "fops" {e.g., clodinafop, diclofop, fluazifop, haloxyfop, or quizalofop), and "dens" (such as pinoxaden); or oxynil {i.e. bromoxynil or ioxynil) herbicides as a result of conventional methods of breeding or genetic engineering, Thus, soybeans of the invention can be made resistant to multiple classes of herbicides through multiple genetic modifications, such as for example the aforementioned FG72, FG72xLL55 and MGI soybeans; further examples of such resistance to multiple classes of herbicides include resistance to glyphosate, glufosinate, dicamba and HPPD inhibitors such as isoxaflutole or mesotrione; glyphosate, PPO inhibitors and HPPD inhibitors; glufosinate, HPPD inhibitors and PPO inhibitors; glyphosate, glufosinate, HPPD inhibitors and PPO inhibitors; glyphosate, dicamba, HPPD inhibitors and PPO inhibitors; glyphosate, 2,4-D, HPPD inhibitors and PPO inhibitors; glyphosate, dicamba, glufosinate, HPPD inhibitors and PPO inhibitors; glyphosate, 2,4-D, glufosinate, HPPD inhibitors and PPO inhibitors; or to one of the aforementioned soybeans that are tolerant to further classes of herbicides such as AHAS inhibitors or ACCase inhibitors. These herbicide resistance technologies are, for example, described in Pest Management Science (at volume, year, page): 61, 2005, 246; 61, 2005, 258; 61, 2005, 277; 61, 2005, 269; 61, 2005, 286; 64, 2008, 326; 64, 2008, 332; Weed Science 57, 2009, 108; Australian Journal of Agricultural Research 58, 2007, 708; Science 316, 2007, 1185; and references quoted therein.

In addition to these classes of inhibitors, soybeans of the invention may also be tolerant to herbicides having other modes of action, for example, chlorophyll/carotenoid pigment inhibitors, cell membrane disrupters, photosynthesis inhibitors, cell division inhibitors, root inhibitors, shoot inhibitors, and combinations thereof.

Such additional tolerance traits may be expressed, e.g.: as mutant or wildtype PPO proteins, as mutant AHASL proteins, mutant ACCase proteins, mutant EPSPS proteins, or mutant glutamine synthetase proteins; or as mutant native, inbred, or transgenic aryloxyalkanoate dioxygenase (AAD or DHT), haloarylnitrilase (BXN), 2,2-dichloropropionic acid dehalogenase (DEH), glyphosate-N-acetyltransferase (GAT), glyphosate decarboxylase (GDC), glyphosate oxidoreductase (GOX), glutathione-S-transferase (GST), phosphinothricin acetyltransferase (PAT or bar), or CYP450s proteins having an herbicide-degrading activity.

Glufosinate tolerant soybeans hereof can also be stacked with other traits including, but not limited to, pesticidal traits such as Bt Cry and other proteins having pesticidal activity toward coleopteran, lepidopteran, nematode, or other pests; nutrition or nutraceutical traits such as modified oil content or oil profile traits, high protein or high amino acid concentration traits, and other trait types known in the art.

Transgenic cotton events comprising HPPD tolerance events are for example, but not excluding others, GHB811 and GHB814 that both confer tolerance to glyphosate and HPPD inhibitors such as isoxaflutole.

In other aspects, cotton plants of the invention include those plants which have been subjected to genetic modifications other than HPPD tolerance by breeding, mutagenesis or genetic engineering, e.g. have been rendered tolerant to applications of specific other classes of herbicides, such as PPO inhibitors (e. g. saflufenacil, trifludimoxazin), AHAS inhibitors; auxinic herbicides such as dicamba or 2,4-D; bleaching herbicides such as hydroxyphenylpyruvate dioxygenase (HPPD) inhibitors (e. g. isoxaflutole, mesotrione, tembotrione, topramezone, bicyclopyrone) or phytoene desaturase (PDS) inhibitors; EPSPS inhibitors such as glyphosate; glutamine synthetase (GS) inhibitors such as glufosinate; lipid biosynthesis inhibitors such as acetyl CoA carboxylase (ACCase) inhibitors such as "dims" {e.g., cycloxydim, sethoxydim, clethodim, or tepraloxydim), "fops" {e.g., clodinafop, diclofop, fluazifop, haloxyfop, or quizalofop), and "dens" (such as pinoxaden); or oxynil {i.e. bromoxynil or ioxynil) herbicides as a result of conventional methods of breeding or genetic engineering, Thus, cotton plants of the invention can be made resistant to multiple classes of herbicides through multiple genetic modifications, such as for example resistance to glyphosate and HPPD inhibitors such as isoxaflutole; glyphosate, glufosinate and HPPD inhibitors such as isoxaflutole; glufosinate and HPPD inhibitors such as isoxaflutole; glyphosate, glufosinate, dicamba and HPPD inhibitors such as isoxaflutole; glyphosate, PPO inhibitors and HPPD inhibitors; glufosinate, HPPD inhibitors and PPO inhibitors; glyphosate, glufosinate, HPPD inhibitors and PPO inhibitors; glyphosate, dicamba, HPPD inhibitors and PPO inhibitors; glyphosate, 2,4-D, glufosinate, HPPD inhibitors and PPO inhibitors; glyphosate, dicamba, glufosinate, HPPD inhibitors and PPO inhibitors; or to one of the aforementioned cotton plants that are tolerant to further classes of herbicides such as AHAS inhibitors or ACCase inhibitors. These herbicide resistance technologies are, for example, described in Pest Management Science (at volume, year, page): 61, 2005, 246; 61, 2005, 258; 61, 2005, 277; 61, 2005, 269; 61, 2005, 286; 64, 2008, 326; 64, 2008, 332; Weed Science 57, 2009, 108; Australian Journal of Agricultural Research 58, 2007, 708; Science 316, 2007, 1185; and references quoted therein.

In addition to these classes of inhibitors, cotton plants of the invention may also be tolerant to herbicides having other modes of action, for example, chlorophyll/carotenoid pigment inhibitors, cell membrane disrupters, photosynthesis inhibitors, cell division inhibitors, root inhibitors, shoot inhibitors, and combinations thereof.

Such additional tolerance traits may be expressed, e.g.: as mutant or wildtype PPO proteins, as mutant AHASL proteins, mutant ACCase proteins, mutant EPSPS proteins, or mutant glutamine synthetase proteins; or as mutant native, inbred, or transgenic aryloxyalkanoate dioxygenase (AAD or DHT), haloarylnitrilase (BXN), 2,2-dichloropropionic acid dehalogenase (DEH), glyphosate-N-acetyltransferase (GAT), glyphosate decarboxylase (GDC), glyphosate oxidoreductase (GOX), glutathione-S-transferase (GST), phosphinothricin acetyltransferase (PAT or bar), or CYP450s proteins having an herbicide-degrading activity.

Glufosinate tolerant cotton plants hereof can also be stacked with other traits including, but not limited to, pesticidal traits such as Bt Cry and other proteins having pesticidal activity toward coleopteran, lepidopteran, nematode, or other pests; nutrition or nutraceutical traits such as modified oil content or oil profile traits, high protein or high amino acid concentration traits, and other trait types known in the art.

In all treatments according to the methods of the present invention, the inventive mixtures can be applied in conventional manner by using techniques as skilled person is familiar with. Suitable techniques include spraying, atomizing, dusting, spreading or watering. The type of application depends on the intended purpose in a well known manner; in any case, they should ensure the finest possible distribution of the active ingredients according to the invention.

In one embodiment, the inventive mixtures are applied to locus mainly by spraying, in particular foliar spraying of an aqueous dilution of the active ingredients of the mixture. Application can be carried out by customary spraying techniques using, for example, water as carrier and spray liquor rates of from about 10 to 2000 l/ha or 50 to 1000 l/ha (for example from 100 to 500 l/ha). Application of the inventive mixtures by the low-volume and the ultra-low-volume method is possible, as is their application in the form of microgranules.

The required application rate of the mixture of the pure active compounds depends on the density of the undesired vegetation, on the development stage of the plants, on the climatic conditions of the location where the mixture is used and on the application method.

In general, the rate of application of L-glufosinate is usually from 50 g/ha to 3000 g/ha and preferably in the range from 100 g/ha to 2000 g/ha or from 200 g/ha to 1500 g/ha of active substance (a.i.), and the rate of application of the second herbicida compound II is from 1 g/ha to 2000 g/ha and preferably in the range from 5 g/ha to 1500 g/ha, more preferably from 25 g/ha to 900 g/ha of active substance (a.i.).

The examples which follow illustrate the invention without imposing any limitation.

BIOLOGICAL EXAMPLES

Biological tests can demonstrate the control efficacy of compounds, mixtures or compositions of this invention on specific weeds. However, the weed control afforded by the compounds, mixtures or compositions is not limited to these species. The analysis of synergism or antagonism between the mixtures or compositions is determined using Colby's equation.

Synergism can be described as an interaction where the combined effect of two or more compounds is greater than the sum of the individual effects of each of the compounds. The presence of a synergistic effect in terms of percent control, between two mixing partners (X and Y) can be calculated using the Colby equation (Colby, S. R., 1967, Calculating Synergistic and Antagonistic Responses in Herbicide Combinations, Weeds, 15, 21-22):

$$E=X+Y-XY/100$$

When the observed combined control effect is greater than the expected (calculated) combined control effect (E), then the combined effect is synergistic.

The synergistic weed control by the mixtures according to the present invention was demonstrated by the following greenhouse experiment:

The culture containers used were plastic flowerpots containing loamy sand with approximately 3.0% of humus as the substrate. The seeds of the test plants were sown separately for each species. For pre-emergence treatment, the active ingredients, which had been suspended or emulsified in water, were applied directly after sowing by means of finely distributing nozzles. The containers were irrigated gently to promote germination and growth and subsequently covered with transparent plastic hoods until the plants had rooted. This cover caused uniform germination of the test plants, unless this had been impaired by the active ingredients. For postemergence treatment, the test plants were first grown to a height of 3 to 32 cm, depending on the plant habit, and only then treated with the active ingredients which had been suspended or emulsified in water. For this purpose, the test plants were either sown directly and grown in the same containers, or they were first grown separately as seedlings and transplanted into the test containers a few days prior to treatment. Depending on the species, the plants were kept at 10-25° C. or 20-35° C., respectively. The test period extended over 20 days. During this time, the plants were tended, and their response to the individual treatments was evaluated. The evaluation was carried out by using a scale from 0 to 100. 100 means no emergence of the plants or complete destruction of at least the above-ground parts, and 0 means no damage, or normal course of growth.

The plants used in the following pre-emergence greenhouse experiment were of the following species:

| EPPO code | Scientific name | Common name |
|---|---|---|
| GALAP | Galium aparine | Cleavers; bedstraw |

The active ingredients used in the following post-emergence greenhouse experiment were formulated as follows: Isoxaflutole, 75% WG; pyroxasulfone, 85% WG; imazethapyr, 240 g/liter SL.

The results shown in the following table demonstrate the synergistic action of mixtures of isoxaflutole and the known mixture of pyroxasulfone and imazethapyr.

| Application rate in g/ha | | Herbicidal action against GALAP | |
|---|---|---|---|
| Isoxaflutole | Pyroxasulfone + imazethapyr | Found | Calculated according to Colby |
| 25 g/ha | — | 0 | — |
| — | 50 + 5 g/ha | 55 | — |
| 25 g/ha | 50 + 5 g/ha | 98 | 55 |

| Application rate in g/ha | | Herbicidal action against GALAP | |
|---|---|---|---|
| Isoxaflutole | Pyroxasulfone + imazethapyr | Found | Calculated according to Colby |
| 12.5 g/ha | — | 0 | — |
| — | 25 + 2.5 g/ha | 30 | — |
| 12.5 g/ha | 25 + 2.5 g/ha | 90 | 30 |

The invention claimed is:

1. An herbicidal mixture comprising
   1) isoxaflutole (compound I),
   2) pyroxasulfone (compound II), and
   3) an imidazolinone herbicide selected from the group consisting of imazethapyr and its salts (compound III),
   wherein a weight ratio of compound I to compound II is from 5:1 to 1:10, and a weight ratio of compound I to compound III is from 15:1 to 1.1.

2. The herbicidal mixture as claimed in claim 1, wherein the compound III is selected from the group consisting of imazethapyr and imazethapyr ammonium.

3. A pesticidal composition, comprising a liquid or solid carrier and a mixture as defined in claim 1.

4. A method for controlling undesirable vegetation, comprising applying a mixture according to claim 1 to a locus where undesirable vegetation is present or is expected to be present.

5. The method as claimed in claim 4, comprising application of the mixture prior to emergence of a crop (pre-emergence).

6. The method as claimed in claim 4, comprising application of the mixture prior to planting a crop.

7. The method as claimed in claim 4, wherein undesirable vegetation is soybean.

8. The method as claimed in claim 7 wherein the soybean is herbicide-tolerant soybean.

9. The method as claimed in claim 4, wherein undesirable vegetation is cotton.

10. The method as claimed in claim 9 wherein the cotton is herbicide-tolerant cotton.

11. The method as claimed in claim 4 wherein the undesirable vegetation is of the genus *Amaranthus*.

12. The herbicidal mixture of claim 1 wherein the weight ratio of compound I to compound II is from 3:1 to 1:3.

13. The herbicidal mixture of claim 1 wherein the weight ratio of compound 1 to compound III is from 5:1 to 3:1.

\* \* \* \* \*